Patented May 22, 1934

1,959,478

UNITED STATES PATENT OFFICE 1,959,478

DERIVATIVE OF HIGHER FATTY ACIDS AND PROCESS OF MAKING SAME

Karl Keller, Frankfort-on-the-Main-Fechenheim, Germany, assignor to General Aniline Works, Inc., New York, N. Y., a corporation of Delaware No Drawing. Application May 13, 1930, Serial No. 452,141. In Germany May 23, 1929

8 Claims. (Cl. 260—112)

The present invention relates to new derivatives of higher fatty acids and to a process of making the same.

I have found that new derivatives of higher fatty acids are obtained by heating halogenated derivatives of higher fatty or hydroxy fatty acid compounds containing more than 8 carbon atoms and at least 2 halogen atoms attached to carbon atoms of the chain and introduced into the fatty acid molecule by substitution of hydrogen atoms (obtainable for instance according to U. S. Patent 1,862,596, dated June 14, 1932 of Karl Keller and Ferdinand Münz, application filed July 10, 1929), with an alkaline acting agent selected from the group consisting of hydroxides or carbonates of alkali or alkaline-earth metals with addition of water or an organic diluent, particularly of a lower aliphatic alcohol. In some cases the addition of a catalyst and heating in a closed vessel is of an advantage for finishing the reaction.

According to the conditions applied the halogen atoms of the starting materials are entirely or partly eliminated. Probably the halogen atoms are partly replaced by hydroxyl-groups, partly split off while forming new double bonds.

By this complicated course of reaction products are obtained which differ in their chemical and physical behaviour from the hydroxy-fatty acid compounds hitherto known. The new products are easily soluble in alkalies and can be precipitated as viscous oils from the alkaline solutions by acidification. Their salts may be isolated, for instance, by salting out the aqueous solutions thereof. They represent soaps distinguished by a good purifying effect. They may be used as valuable emulsifying agents and are suitable for various other technical applications. When using derivatives of halogenated fatty acids as starting material, such as esters or amides, products of corresponding properties are obtained. All of the products obtained according to the present process, particularly those, still containing one or more halogen atoms in their molecule, are capable of further chemical reactions of decomposition and may be used as intermediates for the production of new valuable products.

When heating the same starting materials with solutions of weak alkalies, such as aqueous solutions of ammonia, sodium carbonate, phosphate or acetate, ammonium formate, urea or mixtures of such agents according to my U. S. Patent 1,906,229 dated May 2, 1933, (application filed January 4, 1930), highly condensed products are obtained of more or less caoutchouc-like character, which are insoluble in water, dilute acids and alkalies. When using in my present process solutions of alkali metal carbonates, in some cases more or less of the aforesaid condensation products are obtained as by-products which can easily be separated inasmuch as they are insoluble in dilute alkalies whereas my present products are soluble therein as stated above.

In order to further illustrate my invention the following examples are given, the parts being by weight and all temperatures in centigrade degrees, but it is to be understood, that my invention is not limited to the particular products nor reacting conditions mentioned therein.

Example 1

35.5 parts of a dichlorinated stearic acid are heated for some hours with a solution of 10 parts of sodium hydroxide in about 100 parts of water at about 190–200° in an autoclave. When cooling down the solution obtained is acidified by means of hydrochloric acid and the separated fatty acid compound is isolated. It represents an almost colorless oil of an unsaturated character containing hydroxyl groups.

Example 2

42.5 parts of a chlorinated oleic acid containing 4 chlorin atoms are heated from 1 to 2 hours with about 200 parts of a caustic soda solution of 20% strength at about 120–125° in an autoclave. From the yellow solution thus obtained the sodium salt of the free acid may be isolated in a manner as described above. The new acid is of an unsaturated character; it contains hydroxyl-groups and still 1 chlorine atom, which can be likewise eliminated by further heating with a caustic soda solution.

Example 3

60.5 parts of a tetrabrominated oleic acid are boiled for several hours in an apparatus provided with a reflux condenser with a solution of 25 parts of caustic potash in about 150 parts of water. From the solution thus obtained, which may be advantageously purified by filtration, the potassium salt of the formed fatty acid compound may be isolated by adding potassium chloride. The free acid contains hydroxyl-groups and still bromine atoms and is of an unsaturated character.

Example 4

48.5 parts of a penta-chlorinated ricinoleic acid are heated for about 4 hours with a solution of 28 parts of caustic soda in about 100 parts of water at 140–150° in an autoclave. A yellowish brown solution is obtained, from which the sodium salt of the formed fatty acid compound may be isolated as a semisolid yellow product. The free acid separated in the usual manner contains, as proved by analysis of the raw product, about one double bond, hydroxyl-groups and still one chlorine atom in the molecule. This chlorine atom is replaceable by other groups.

Example 5

24.5 parts of a hexachlorinated stearic acid are boiled in an apparatus provided with a reflux condenser for about 2 hours with a solution of 16 parts of caustic soda in about 350 parts of water. The solution thus obtained is acidified by addition of dilute sulfuric acid, the separated yellowish viscous oil is removed from the salt solution, repeatedly washed with water and dried in vacuo. The reaction product shows in its chemical behaviour the character of an unsaturated hydroxy-fatty acid, it still contains, as proved by analysis, about 4 chlorine atoms in its molecule. It has soap-like properties and can be converted into new valuable compounds by replacing the chlorine atoms by other groups.

Example 6

24.5 parts of the same hexachlorinated stearic acid as used in Example 5 are mixed with a solution of 22.5 parts of caustic potash in about 300 parts of ethylalcohol and the mixture is kept at nearly the boiling point for about 3 hours. The separated potassium chloride is removed by filtration and the alcohol is distilled off. The remaining soft yellowish potassium salt of the formed hydroxy-fatty acid may be immediately used for technical purposes. In order to isolate the free acid the soap-like mass is dissolved in water, the solution is acidified by means of dilute sulfuric acid and the separated oil is washed and dried. It represents an unsaturated hydroxy-fatty acid containing about 2 chlorine atoms in its molecule.

Example 7

48 parts of a hexachlorinated stearic acid are heated for about 4–5 hours with a solution of 80 parts of anhydrous sodium carbonate in about 250 parts of water at 140–150° in an autoclave. When cool the reaction product is stirred with about 250 parts of water and separated from the insoluble condensation product formed as by-product, by filtration. The filtration is acidified and the separated product is removed from the salt solution. It represents a light brown viscous oil of a weakly unsaturated character, containing hydroxyl-groups.

When using potassium-carbonate practically no insoluble condensation product is formed.

Example 8

49 parts of a hexachlorinated stearic acid are mixed with about 350 parts of milk of lime prepared from 60 parts of caustic lime. This mixture is boiled while stirring for about 12 hours in an apparatus provided with a reflux condenser. When cool the compact white reaction mass is extracted with dilute hydrochloric acid. The reaction product being insoluble is separated from the acid solution. It represents a slightly yellowish substance containing hydroxyl-groups and still about 4 chlorine atoms in the molecule.

In the same manner one may use a suspension of barium oxide.

When working under stronger conditions, for instance when heating the components at 140–170° in an autoclave a product of a pronounced unsaturated character is obtained, containing hydroxyl-groups and still 1 to 2 chlorine atoms.

Example 9

26 parts of a hexachlorinated ricinoleic acid are heated for 6–8 hours with a solution of 50 parts of potassium carbonate in about 150 parts of water at 150–160° in an autoclave. When cool the insoluble condensation product formed as by-product is removed by filtration, the filtrate is acidified and the precipitated new fatty acid derivative is separated from the salt solution. It represents a brownish strongly viscous oil of an unsaturated character containing hydroxyl-groups. It is soluble in alkalies, alcohol, chloroform and other organic solvents.

Example 10

51 parts of the same hexachlorinated ricinoleic acid as used in Example 9 are dissolved in a solution of 32 parts of caustic soda in about 250 parts of water while stirring at about 25°. Then the solution is allowed to stand for about 2 days at about 20–25°. By adding common salt to this solution the sodium salt of the new hydroxy fatty acid is isolated as a semisolid, light yellow product. The free acid represents a light yellow oil of an unsaturated character, containing about 2 hydroxyl-groups and still 3 chlorine atoms.

Example 11

25.5 parts of the hexachlorinated recinoleic acid are heated for about 3 hours with a solution of 16 parts of caustic soda in about 75 parts of water at 140–145° in an autoclave. A concentrated dark yellow solution results from which the sodium salt or the free hydroxy-fatty acid formed may be isolated. It is of a pronounced unsaturated character and contains about 2 hydroxyl-groups and still 1 chlorine atom in its molecule.

When heating the starting material for a longer time with the same quantity of caustic soda, advantageously with addition of 0.3 parts of copper powder, an unsaturated hydroxy-fatty acid is obtained free from chlorine.

Example 12

26 parts of a heptachlorinated palmitic acid are boiled for several hours with a solution of 18 parts of caustic soda in about 225 parts of methylalcohol in an apparatus provided with a reflux condenser. When cool the separated sodium chloride is removed by filtration and the methylalcohol is distilled off. From the remaining light yellow, semisolid mass the free acid is isolated in a manner as described above. It still contains about 3 atoms of chlorine in its molecule.

Example 13

27.2 parts of a heptachlorinated ricinoleic acid are heated with a solution of 28 parts of caustic potash in about 400 parts of water for several hours at 80–90°. A clear yellow solution is obtained from which the potassium salt of the new hydroxy-fatty acid can be isolated as a yellow, soft product. The free acid represents a yellow, viscous oil containing 2 atoms of chlorine in its molecule.

Example 14

55.5 parts of a chlorinated technical mixture of linoleic acids containing about 8 chlorine atoms calculated by average molecular weight of said mixture; are boiled with a solution of 25 parts of caustic potash in about 350 parts of water for about 5 hours in an apparatus provided with a reflux condenser. From the yellow solution thus obtained the sodium salt of the new hydroxyfatty acid formed or the free acid may be isolated in a manner as described above. The reaction product corresponds in its properties with the products obtained according to the foregoing examples. It still contains chlorine.

*Example 15*

52.5 parts of the ethylanilide of a tetrachloroderivative of oleic acid, obtained by chlorinating the ethylanilide of oleic acid, are boiled for about 8 hours with a solution of 23 parts of caustic potash in about 140 parts of alcohol in an apparatus provided with a reflux condenser. Then the excess of alkali is neutralized with concentrated hydrochloric acid, the separated potassium chloride is removed by filtration and the alcohol is distilled off. The remaining oil may be purified by dissolving it in a suitable organic solvent. The new compound represents a viscous oil of an unsaturated character, containing hydroxyl-groups and still about 1 chlorine atom in its molecule. Since it contains the ethylanilido-group, it is insoluble in dilute alkalies.

A product of similar properties is obtained when decomposing the tetrachloro-derivative of oleic acid chloride (prepared by acting with 14 parts of chlorine on 30 parts of oleic acid chloride) with monoethylaniline and subjecting the ethylanilide thus formed to the action of the an alcoholic caustic potash solution as described above.

*Example 16*

106.5 parts of the methylanilide of a hexachloro-derivative of ricinoleic acid, obtained by chlorinating the methylanilide of the ricinoleic acid, are heated for several hours with a solution of 52 parts of caustic soda in about 275 parts of water while stirring at 110–120° in an autoclave. When cool the reaction product is separated from the salt solution, washed with water and dried. It represents an oil of an unsaturated character, containing hydroxyl-groups, but being free from chlorine.

I claim:

1. A process for producing new derivatives of higher fatty acids which process comprises heating halogenated derivatives of higher fatty acid compounds of the general formula $C_nH_{2n-x}R\text{-}Hal_xCOY$, wherein R means hydrogen or hydroxyl, Y represents

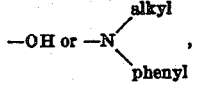

$n$ stands for a number more than 7 and $x$ for a number more than 1, the halogen atoms being attached to carbon atoms of the chain and introduced into the fatty acid molecule by substitution of hydrogen atoms with an alkaline acting agent selected from the group consisting of hydroxides and carbonates of alkali and alkaline-earth metals in the presence of a diluent.

2. A process for producing new derivatives of higher fatty acids which process comprises heating halogenated derivatives of higher fatty acid compounds of the general formula $C_mH_{2m-x}R\text{·}Hal_x\text{-}COY$, wherein R means hydrogen or hydroxyl, Y represents

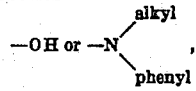

$m$ stands for the number 15, 16 or 17, $x$ for a number more than 1, the halogen atoms being attached to carbon atoms of the chain and introduced into the fatty acid molecule by substitution of hydrogen atoms with an alkaline acting agent selected from the group consisting of hydroxides and carbonates of alkali and alkaline-earth metals in the presence of a diluent.

3. A process for producing new derivatives of higher fatty acids which process comprises heating halogenated derivatives of higher fatty acid compounds of the general formula $C_{17}H_{34-x}R\text{·}Hal_x\text{-}COY$, wherein R means hydrogen or hydroxyl, Y represents

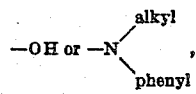

and $x$ stands for a number more than 1, the halogen atoms being attached to carbon atoms of the chain and introduced into the fatty acid molecule by substitution of hydrogen atoms with an alkaline acting agent selected from the group consisting of hydroxides and carbonates of alkali and alkaline-earth metals in the presence of a diluent.

4. A process for producing new derivatives of higher fatty acids which process comprises heating halogenated derivatives of higher fatty acid compounds of the general formula $C_{17}H_{34-x}RHal_x\text{-}COY$, wherein R means hydrogen or hydroxyl, Y represents

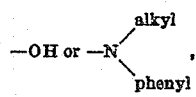

and $x$ stands for a number more than 1, the halogen atoms being attached to carbon atoms of the chain and introduced into the fatty acid molecule by substitution of hydrogen atoms with a caustic alkali solution.

5. As new compounds the hydroxy-fatty acid compounds of an unsaturated character which contain one or more hydroxyl-groups, which products represent viscous oils, mostly soluble in dilute alkalies, forming soap-like salts distinguished by a good emulsifying effect, and which are obtainable by heating halogenated derivatives of higher fatty acid compounds of the general formula $C_nH_{2n-x}R\ Hal_xCOY$, wherein R means hydrogen or hydroxyl, Y represents

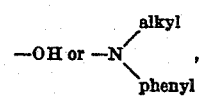

$n$ stands for a number more than 7 and $x$ for a number more than 1, the halogen atoms being attached to carbon atoms of the chain and introduced into the fatty acid molecule by substitution of hydrogen atoms with an alkaline acting agent selected from the group consisting of hydroxides and carbonates of alkali and alkaline-earth metals in the presence of a diluent.

6. As new compounds the hydroxy-fatty acid compounds of an unsaturated character which contain one or more hydroxyl-groups, which products represent viscous oils, mostly soluble in dilute alkalies, forming soap-like salts distinguished by a good emulsifying effect, and which are obtainable by heating halogenated derivatives of higher fatty acid compounds of the general formula $C_mH_{2m-x}RHal_xCOY$, wherein R means hydrogen or hydroxyl, Y represents

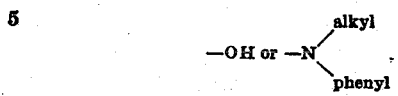

$m$ stands for the number 15, 16 or 17, $x$ for a number more than 1, the halogen atoms being attached to carbon atoms of the chain and introduced into the fatty acid molecule by substitution of hydrogen atoms with an alkaline acting agent selected from the group consisting of hydroxides and carbonates of alkali and alkaline-earth metals in the presence of a diluent.

7. As new compounds the hydroxy-fatty acid compounds of an unsaturated character which contain one or more hydroxyl-groups, which products represent viscous oils, mostly soluble in dilute alkalies, forming soap-like salts distinguished by a good emulsifying effect, and which are obtainable by heating halogenated derivatives of higher fatty acid compounds of the general formula $C_{17}H_{34-x}RHal_xCOY$, wherein R means hydrogen or hydroxyl, Y represents

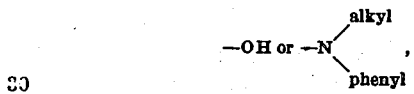

and $x$ stands for a number more than 1, the halogen atoms being attached to carbon atoms of the chain and introduced into the fatty acid molecule by substitution of hydrogen atoms with an alkaline acting agent selected from the group consisting of hydroxides and carbonates of alkali and alkaline-earth metals in the presence of a diluent.

8. As new compounds the hydroxy-fatty acid compounds of an unsaturated character which contain one or more hydroxyl-groups, which products represent viscous oils, mostly soluble in dilute alkalies, forming soap-like salts distinguished by a good emulsifying effect, and which are obtainable by heating halogenated derivatives of higher fatty acid compounds of the general formula $C_{17}H_{34-x}RHal_xCOY$, wherein R means hydrogen or hydroxyl, Y represents

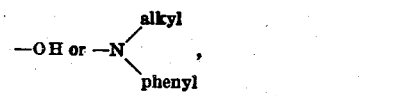

and $x$ stands for a number more than 1, the halgen atoms being attached to carbon atoms of the chain and introduced into the fatty acid molecule by substitution of hydrogen atoms with a caustic alkali solution.

KARL KELLER.